United States Patent [19]

Magnuson

[11] 3,986,748

[45] Oct. 19, 1976

[54] TRACTOR CHAIR CUSHION DEVICE

[76] Inventor: Emil Magnuson, Cavalier, N. Dak. 58220

[22] Filed: Sept. 2, 1975

[21] Appl. No.: 609,582

Related U.S. Application Data

[63] Continuation-in-part of Ser. No. 361,484, May 18, 1973, abandoned.

[52] U.S. Cl. ............................. 296/65 R; 297/307
[51] Int. Cl.² ..................................... B60N 1/02
[58] Field of Search ........... 297/307; 248/397, 400; 296/63, 65 R, 65 A

[56] References Cited
UNITED STATES PATENTS

| | | | |
|---|---|---|---|
| 2,760,552 | 8/1956 | Decker | 248/400 |
| 3,140,118 | 7/1964 | Dorn | 297/302 |
| 3,620,568 | 11/1971 | Morrow | 297/307 |
| 3,883,172 | 5/1975 | Barton et al. | 296/65 R |

FOREIGN PATENTS OR APPLICATIONS

| | | | |
|---|---|---|---|
| 1,089,285 | 9/1960 | Germany | 296/63 |

*Primary Examiner*—M. H. Wood, Jr.
*Assistant Examiner*—David M. Mitchell
*Attorney, Agent, or Firm*—Robert E. Kleve

[57] ABSTRACT

The invention comprises a tractor cab having a drivers chair therein. A plurality of shock absorbing means are mounted between the tractor cabs and the chair and extend upward and downward from the chair to the cab to cushion the movement of the chair relative to the cab either upward or downward or to one side or the other relative to the cab.

4 Claims, 5 Drawing Figures

TRACTOR CHAIR CUSHION DEVICE

This is a continuation-in-part of my co-pending patent application, Ser. No. 361,484, filed May 18, 1973 now abandoned.

This invention relates to tractor chairs.

It is an object of the invention to provide a novel suspended tractor chain which is cushioned from the top and the bottom of the cab.

It is another object of the invention to provide a novel means of cushioning and suspending a tractor chain relative to the cab of the tractor.

It is another object of the invention to provide a novel tractor suspension device having a tractor chair with shock absorbing means which suspends and cushions the chain from upward or downward movement or movement to one side or the other relative to the tractor cab.

Additional objects and advantages of the invention will become apparent as the description proceeds and when taken in conjunction with the accompanying drawing wherein.

Briefly stated, the invention comprises a tractor cab having a driver's chair therein, a plurality of shock absorbing means having their upper ends mounted to the top of the cab and their lower ends attached to the chain, a second plurality of shock absorbing means having their lower ends extending outwardly from the sides of the chair and attached to the floor, and their upper ends attached to the chair to suspend the chair relative to the cab and cushion the movement of the chair in either an upward or downward movement or to one side or the other relative to the cab, as well as forward and reward relative to the cab.

The invention also has elastic cushioning means having its one end attached to the rear of the chair and its other end attached to the floor of the cab in front of the chair to further cushion the rearward movement of the chair relative to the cab.

Figure 1:
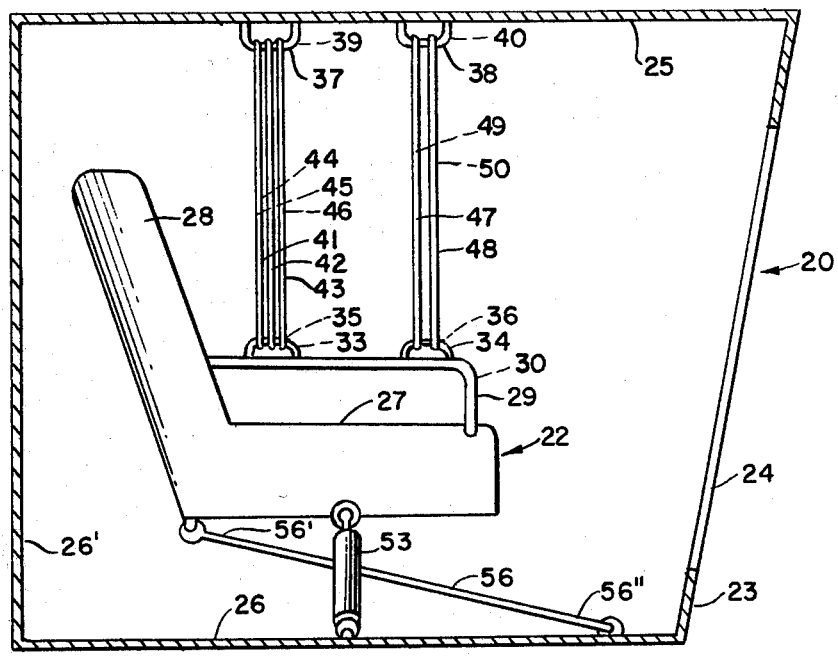
FIG. 1 is a side elevational view of the tractor chair suspension and cushioning invention.
Figure 2:
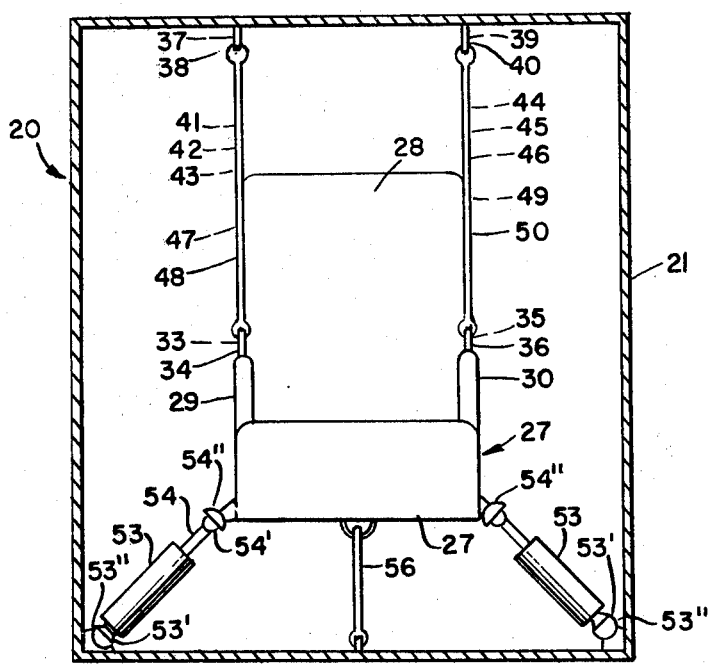
FIG. 2 is a front elevational view of the tractor chair suspension and cushioning invention.
Figure 3:
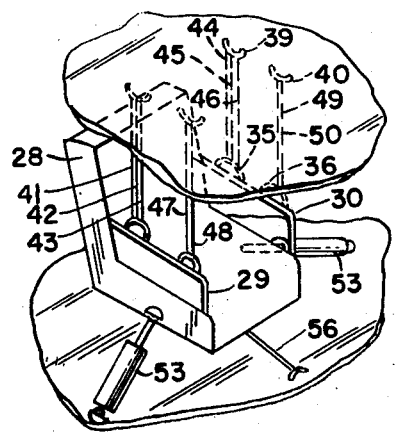
FIG. 3 is a perspective view of the tractor chair suspension and cushioning invention.

Referring more particularly to the drawing in FIGS. 1 and 2, the tractor chair cushioning and suspension invention 20 is illustrated as having a conventional tractor cab 21 with a chair 22 for driver of the tractor to sit upon while operating the tractor.

The tractor cab 21 is conventional having a front wall 23 with a windshield 24 for the driver to look through, when driving the tractor forward. The tractor cab has conventional side doors and controls not shown for entry into the tractor cab and for operating the tractor.

The tractor cab has a top or ceiling 25 and a floor 26 and a back wall 26'. The chair 22 has a seat 27 and a back 28 fixed to the seat. A pair of L-shaped rod arm rests 29 and 30 are fixed to the chair. One end 31 of the arm rests 29 and 30 are fixed to the back 28 and their other ends 32 are fixed to the seat of the chair.

A pair of U-shaped reings 33 and 34 are fixed to the arm rest 29 and a pair of U-shaped rings 35 and 36 are fixed to the arm rest 30 directly opposite the rings 33 and 34.

A pair of rings 37 and 38 are fixed to the ceiling 25 of the cab, and directly above the rings 33 and 34, respectively. A similar pair of rings 39 and 40 are fixed to the ceilings 25, directly above the rings 34.

Three elastic strings 41, 42, and 43 have their lower neds attached to ring 33. A similar pair of elastic strings 44 and 45 have their lower ends attached to ring 34. The upper ends of elastic strings 41, 42, and 43 are attached to ring 37 and the upper ends of strings 44 and 45 are attached to ring 38.

Three elastic strings 46, 47, and 48 have their lower ends attached to ring 35 and a pair of elastic strings 49 and 50 have their lower ends attached to ring 36. The upper ends of elastic strings 46, 47, and 48 are attached to ring 39. The upper ends of strings 49 and 50 have their upper ends attached to ring 40.

A pair of conventional hydraulic or air shock absorbers 51 and 52 have each a cylinder 53. The cylinder 53 of each shock absorber has a ball 53' fixed at its outer end and a socket 53" and rotatably or swively mounted to the ball 53' to form a ball and socket connection. The sockets 53" are in turn fixed to the floor 25' of the tractor cab.

The shock absorbers 51 and 52 also have piston members 54. The piston members 54 have a ball 54' fixed to their outer ends and a socket 54" is rotatably or swively mounted to the ball 54. The sockets 54" are inturn fixed to the opposite sides 55 and 55' of the seat 27 of the chair 22.

The shock absorbers 51 and 52 converge upward toward one another to the seat 27 of the chair from opposite sides of the chair at approximately a 45° angle.

An elastic band 56 has its rear end 56' fixed to the seat of the chair and its forward end 56" fixed to the floor 26 of the tractor cab in front of the chair.

The operator of the tractor will normally sit in the chair 21 with his feet against the front wall portion 57 of the front wall 23 of the cab.

The elastic bands 41, 42, 43, 44, and 45 act to suspend the chair from the ceiling of the cab along one side of the chair and cushion the downward movement of the chair relative to the cab. The elastic bands 46, 47, 48, 49, and 50 act to suspend the chair from the ceiling along the other side of the chair and cushion the downward movement of the chair relative to the cab.

The shock absorbers 51 and 52 which project upward and converge to the seat of the chair act by the pistons 54 retracting into the cylinder 53 and telescoping outward to cushion the upward and downward movement of the chair reltive to the cab.

Also, by the swivel mounting of the shock absorbers 51 and 52 at their both ends act to cushion the movement of the chair relative to the cab to either one side 59 or the other side 60 of the cab. Also, the shock absorbers 51 and 52, by their swivel mounting, act to cushion the forward and backward movement of the chair relative to the cab toward either the front wall 24 or back wall 26.

The elastic band 56 also acts to further cushion the rearward movement of the chair 22 relative to the tractor cab.

The operator when sitting on the chair 22, by placing his feet against the front wall portion 57, acts to further cushion any forward movement of the chair relative to the cab. Thus it will be seen that a novel suspended tractor chair device has been provided which suspends the chair in the tractor cab. The elastic strings and shock absorbers 51 and 52 have enough strength to suspend the chair when the operator sits in the chair while operating the tractor, with the chair in the position as generally illustrated in FIGS. 1 and 2. The elastic strings and shock absorbers 51 and 52 will retard and cushion the movement of the chair when the operator is sitting in the chair and operating the tractor either upwardly or downwardly relative to the cab or to one side or the other or to the front or back.

Consequently, when the tractor is driven over relatively rough ground which will jar the tractor, the suspended tractor chair will be cushioned against movement either upward, downward, one side or the other, or front or back, relative to the cab by the elastic strings and shock absorbers to cushion the movement of the chair relative to the cab. Consequently, the operator will have a relatively smoother ride as the chair in which he rides will be cushioned against sudden or jarring movements of the tractor cab.

Figure 4:
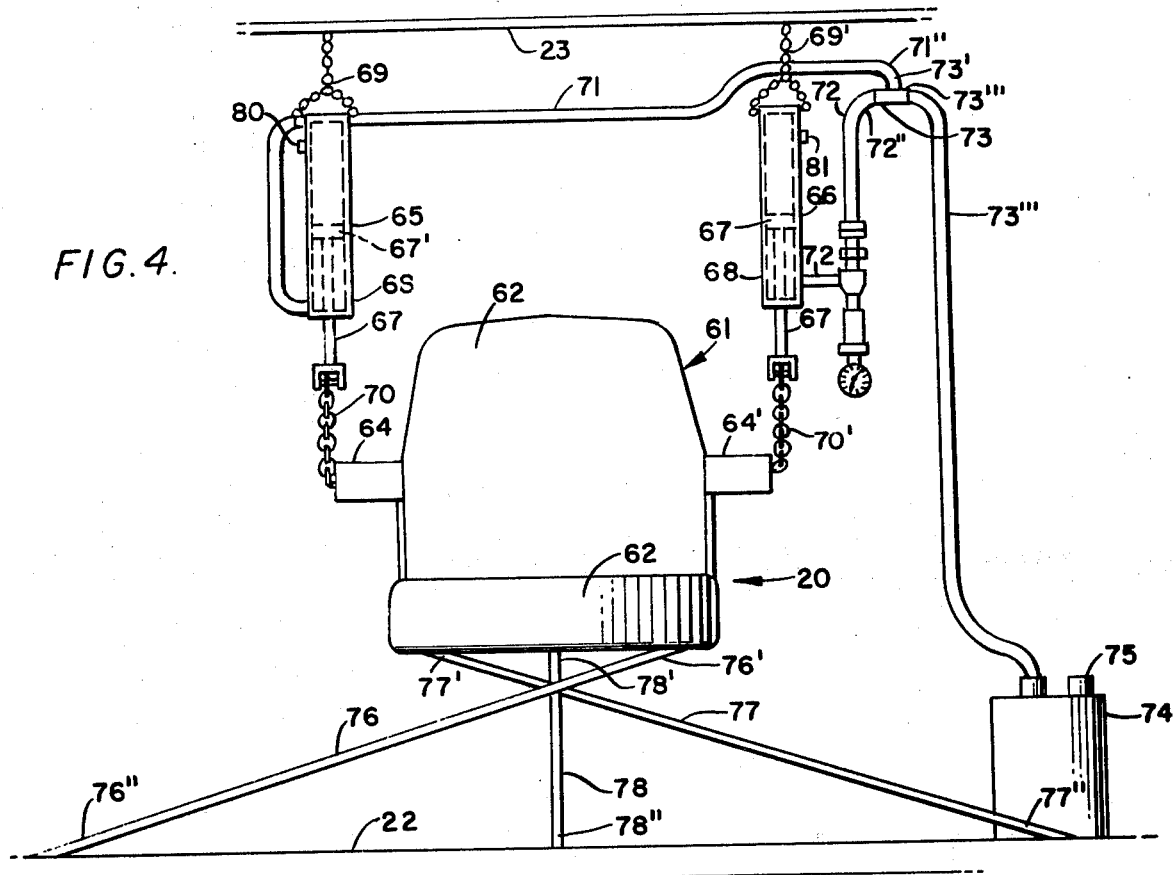
FIG. 4 is a front elevational view of a modified form of the tractor cushioning invention.
Figure 5:
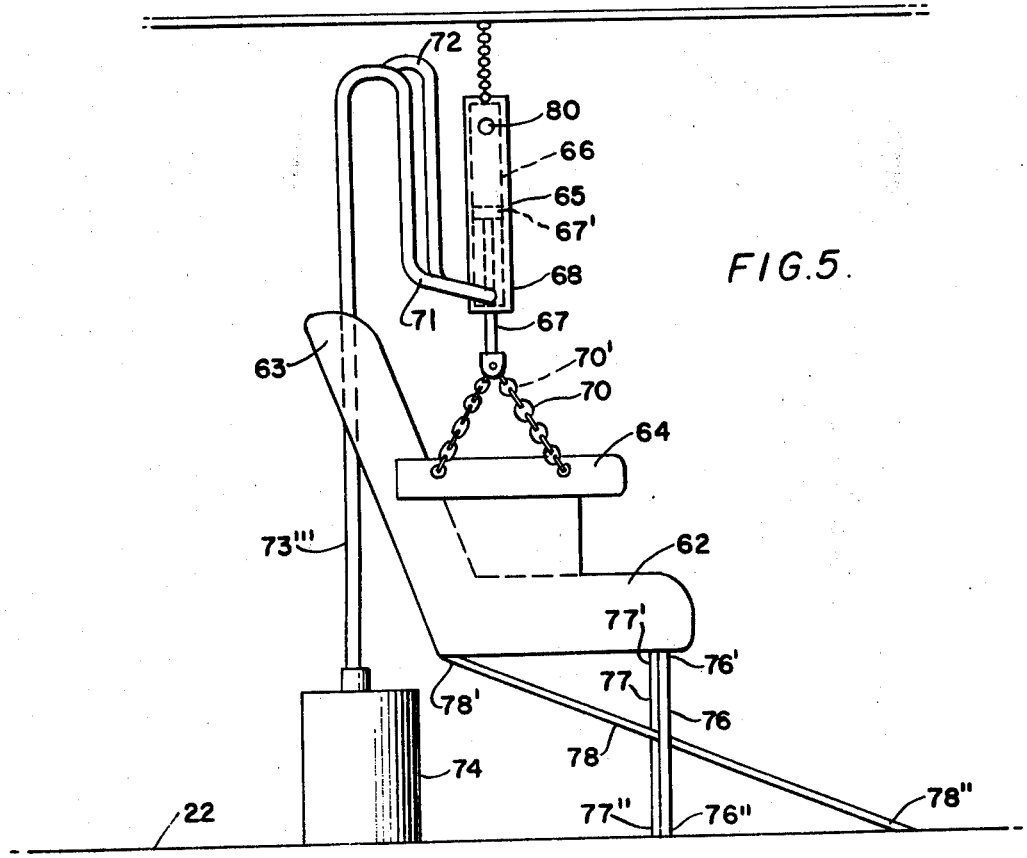
FIG. 5 is a side elevational view of the modified form of the invention.

The modification being added by this Continuation-in-Part is illustrate in FIGS. 4 and 5. The modified tractor chain cushioning device 20 is illustrated mounted in a conventional tractor cab 21. The floor 22 of the cab and the ceiling 23 of the cab are illustrated in FIGS. 1 and 2.

The tractor chair 61 is of a conventional type of chair having a seat portion 62 and a back portion 63 with side arms 64 and 64' fixed to the seat portion and back portion on opposite sides thereof.

A pair of air actuated cylinders 65 and 66 each has a conventional piston member 67 and a cylinder member 68. The piston members have a piston head 67' slidably mounted in its respective cylinder. The cylinder member 68 of the cylinders 65 and 66 are mounted to the ceiling 22 by link chain connections 69 and 69' to provide a swinging rotatable connection. The piston member 67 of the cylinders 65 and 66 are mounted to the arms 64 and 64', respectively, by link chains 70 and 70' to provide a swinging rotatable connection.

The cylinder portions 68 of both cylinders 65 and 66 have an air hose line connections 71 and 72, respectively, with the one ends 71' and 72' mounted to cylinder portion of cylinders 65 and 66, respectively, to allow air to travel from within the hose line into the interior chamber of the cylinder portion 68 of cylinders 65 and 66.

The other end 71" and 72" of the air hose line are connected to the legs 73' and 73" of the T-joint hose connection to an air hose line reservoir tank 74 to communicate with the interior of the tank.

A conventional check valve 75 is also mounted on the pressure tank 74 so that a conventional type air hose line from an air compressor can be connected to the check valve 75 and air forced into the tank to provide air under pressure in the tank, hose lines, and interior chamber of the cylinder portions 68 of cylinders 65 and 66.

Three elastic bands 76, 77, and 78 have their one ends 76', 77', and 78' connected to the underside of the seat 61 and their other ends 76", 77", and 78" connected to the floor 22 of the cab in three directions, as illustrated in FIGS. 4 and 5, and are taunt so that movement of the chair either rearward, as seen from FIG. 5, or to either the left side or right side, as illustrated in FIG. 4, the bands 76, 77, 78, respectively will cushion the movement of the chair. A fourth elastic band, not shown, may be added with its one end mounted to the underside of the chair and extending rearward, to the left and downward at an angle to the floor when viewed from FIG. 5, to cushion the chair against forward movement.

In the normal operation of a tractor over terrain having ridges, it is the up and down sudden jarring movement of the tractor which causes the most discomfort to the operator of the tractor seated in the chair.

The tractor chair invention 20 acts to cushion the upward and downward movement of the chair and the tractor moves up and down. Prior to the operating of the tractor, approximately 60 lbs of air will be pumped into the tank 74. This air through the air hose lines 73''', 71, and 72 provides approximately 60 lbs of air in the interior chamber of the cylinder 68 of both cylinders 65 abd 66 with this air pressing against the heads 67' of the piston members. This amount of air under pressure is normally sufficient to hold the piston heads 67' and pistons 67 of cylinders 65 and 66 in an intermediate position in the chambers of the cylinders 65 and 66, such as illustrated in FIGS. 4 and 5 and suspends the chair in its position shown in FIGS. 4 and 5 when the chair is under the weight of an operator who weighs approximately 180 lbs. when he is seated in the chair and will be sufficient to cushion the movement of the chair either upward or downward with the operator seated in the chair.

As the tractor travels over ridges in the fields, at the end of the sudden downward movement of the tractor, the tractor will terminate its downward movement suddenly. The chair continues to move downward with the downward movement of the pistons relative to the cylinders compresing the air into the tank from the cylinders. However, the air pressure in the tank will gradually equalize the force of the movement and cause the chair and pistons to gradually come to a halt in its downward movement and to move gradually back upward relative to the cylinders and return them gradually back upward to their original position as shown in FIGS. 4 and 5 thereby returning the tractor chair with the operator seated thereon back to its original position gradually.

At the abrupt end of a sudden upward movement of the tractor, when striking ridges, the upward movement of the chair will be cushioned by the fact that the chair can continue to move further upward even though the tractor cab has come to a stop by the fact that the pistons can continue to move upward drawing air from the tank into the cylinders and with the air in the cylinder portion on the opposite side of the piston heads escaping out through the holes or ports 80 and 81. However, the air will tend to equalize force of the movement bring the tractor chair gradually to a halt in its upward movement and cause it to return to its original position. Since only a restricted amount of air can escape from the ports 80 and 81 which slows the upward movement of the pistons and chair. Also, the weight of the operator and the chair act as a major factor as the chair moves upward relative to the cab to gradually bring the chair and operator to a halt in its upward movement and will act to gradually bring the chair and operator back down to their position shown in FIS. 4 and 5 by the weight of the operator and the chair pushing the pistons downward gradually compressing air back into the tank.

The urging of band springs 76, 77, and 75 will also act to gradually stop the upward movement of the chair and bring the chair back down to its position shown in FIGS. 4 and 5.

It has been found that a reservoir tank of approximately 2½ gallon capacity is quite adequate with approximately 60 lbs. of air therein to maintain the chair in its suspended position shown in FIGS. 4 and 5 and cushion the movement of the operator while he is seated in the chair, when said operator has a weight of approximately 180 lbs. and the air cylinders have a diameter (I.D.) of approximately two inches and a piston stroke of approximately 12 inches.

If the operator's weight is less than 180 lbs., the air pressure in the tank can be adjusted by having the operator sit in the chair while another person allows air to escape from the reservoir tank through the check valve, to cause the seat, with the operator seated thereon, and the pistons to move downward until they reach the intermediate position shown in FIGS. 4 and 5 at which time no further air will be allowed to escape.

If the operator weighs more than 180 lbs. the air pressure can be adjusted in the tank by having the operator sit in the chair while another person pumps air into the reservoir tank through the check valve to raise the chair and pistons until they reach the intermediate position shown in FIGS. 4 and 5, at which time no additional air will be pumped into the tank.

Once the chair has been adjusted for a certain weight operator, it has been found that the air reservoir tank and cylinders will maintain that pressure for months while the chair is in use by the operator by his operating the tractor. There is no need to pump in additional air to maintain the pressure if the hose connection and cylinders are in good working order and properly connected.

Thus it will be seen that a novel tractor chair cushioning device has been provided which will cushion the upward and downward movement of the chair relative to the tractor while the operator is seated in the chair and while the tractor is traveling over and between ridges which cause sudden stopping of an upward and downward movement of the tractor; that the cushioning action provides a pleasant cushioning ride for the operator seated in the tractor even though the tractor itself is stopping abruptly in its movement either upward or downward in a jarring movement; and that the device may be easily adjusted for people of different weights.

It will be obvious that various changes and departures may be made to the invention without departing from the spirit and scope thereof, and accordingly, it is not intended that the invention be limited to that specifically described in the specification as illustrated in the drawing, but only as set forth in the appended claims wherein:

What is claimed is:

1. A tractor chair cushioning device comprising a tractor chair for mounting in a tractor cab having a floor and ceiling, a pair of fluid actuated cylinders, each comprising a piston and cylinder portion with said piston, having a piston head slidable in said cylinder portion with one end of the cylinders rotatably mounted to the ceiling, with the cylinders extending downward in spaced relation, and with the other ends of the cylinders rotatably mounted to the chair on opposite sides of the chair, a fluid pressure reservoir, means to introduce fluid under pressure into the reservoir fluid hose line means connecting said cylinder portions to said pressure reservoir, to contract the cylinders and pistons relative to one another to place the piston head in an intermediate position in the cylinder portion under fluid pressure to thereby suspend the chair spaced off the floor under fluid pressure and cushion the movement of the chair in either direction upward and downward when the seat is weighted down by an operator of the tractor seated in the chair, cushioning means to cushion the movement of the chair horizontally to the side.

2. A tractor chair cushioning device according to claim 1 wherein said means to intorduce fluid into the pressure reservoir includes a check valve operable to allow additional fluid to be introduced into the reservoir, and to allow fluid to escape from the reservoir to adjust the fluid pressure in the cylinders to correspond to the weight of the operator seated in the chair.

3. A tractor chair chusioning device to cushion an operator's chair in relation to a tractor's cab compartment when riding over bumpy ground, comprising a box-like tractor cab compartment having a roof and a floor with side walls connecting the floor and roof together, an operator's chair comprising a horizontal panel serving as a seat member and an upwardly and rearwardly inclined panel serving as a back rest, said upwardly and rearwardly inclined panel having its lower end attached to the rearward edge of said horizontal panel, at least three cushioning and suspension means to cushion and suspend said chair in spaced relation above the floor and beneath the roof of the cab and in spaced relation to the side walls, said cushioning and suspension means conprising a first pair of elongated elastic suspension means, a pair of fluid actuated cushioning cylinders, a second elongated elastic cushioning means, said first pair of suspension means extending above the chair toward the roof of the compartment with their upper ends attached to the compartment adjacent the roof in laterally spaced relation to one another, with lower ends spaced from one another and attached to opposite lateral sides of the horizontal seat member panel to elastically suspend the operator's chair from the roof of the cab, said pair of actuated cushioning cylinder members being beneath the chair and retractable and extendable relative to one another with cushioning action in either direction, said pair of cylinder members having their lower ends attached to the floor of the cab by a swivel connection at a location centrally between the front and rear edges of the horizontal panel and spaced outward from beneath the horizontal seat panel in laterally spaced relation to one another, said cylinders being inclined upward and laterally inward toward one another and having the upper ends attached to the laterally opposite side edges of the seat member of the chair by a swivel connection at a location centrally between the front and rear edges of the horizontal seat member, to provide a cushioning means for the chair from the floor beneath the chair, a second elongated elastic suspension means beneath the chair having its rearward end attached to the seat member of the chair and projecting forward and downward at an angle beyond the forward edge of the chair to the front of the cab with its front end attached to the floor of the cab to cushion the chair against rearward movement, said first pair of elongated cushioning and suspension means, said cushioning cylinders, and said second elastic suspension means, acting together to place the chair in entirely suspended spaced cushioned relation to the compartment including the floor, roof, and side walls of the compartment.

4. A farm equipment chair cushioning device for cushioning an operator's chair on a farm equipment vehicle relative to the floor and ceiling of the farm vehicle comprising a piston and cylinder portion with said piston having a piston head slidable in said cylinder, said cylinder means having linkage means forming an elongated linkage suspension connection between the chair and ceiling with said linkage and cylinder means suspending the chair from the ceiling and spaced off the ground, said suspension connection being adjustable in length in response to the position of the piston relative to the cylinder to thereby adjust the position of the chair relative to the floor, a fluid pressure reservoir means to intorduce fluid under pressure into the reservoir fluid hose line and means connecting said cylinder portion to said reservoir, to shift the cylinder and piston portions relative to one another to place the piston in an intermediate position in the cylinder under fluid pressure to thereby suspend the chair under fluid pressure spaced off the floor and cushion the movement of the chair in either an upward or downward position relative to the floor when the seat is weighted down by the operator of the vehicle seated in the chair, cushioning means to cushion the movement of the chair horizontally to the side.

\* \* \* \* \*

UNITED STATES PATENT AND TRADEMARK OFFICE
CERTIFICATE OF CORRECTION

PATENT NO. : 3986748
DATED : October 19, 1976
INVENTOR(S) : Emil Magnuson

It is certified that error appears in the above-identified patent and that said Letters Patent are hereby corrected as shown below:

Column 2, line 6, delete "34" and insert --- 35 and 36 ---;
line 9, delete "44 and 45" and insert --- 47 and 48 ---;
lines 11 and 12, delete "44 and 45" and insert --- 47 and 48 ---;
line 13, delete "47 and 48" and insert -- 44 and 45 ---;
line 16, delete "47 and 48" and insert --- 44 and 45 ---;
line 41, delete "44 and 45" and insert --- 47 and 48 ---;
line 45, delete "47 and 48" and insert --- 44 and 45 ---;
line 60, delete "26" and insert --- 26' ---;

Column 3, line 36, delete "22" and insert --- 23 ---;

Column 4, line 67, delete "75" and insert --- 78 ---;

Column 6, line 17, delete "chusioning" and insert --- cushioning ---;

Column 7, line 4, after "comprising" insert --- cylinder means, said cylinder means comprising ---;
line 10, delete "ground" and insert --- floor ---.

Signed and Sealed this

Fifth Day of September 1978

[SEAL]

Attest:

RUTH C. MASON
*Attesting Officer*

DONALD W. BANNER
*Commissioner of Patents and Trademarks*